United States Patent
Goldberg et al.

(10) Patent No.: US 6,816,859 B2
(45) Date of Patent: Nov. 9, 2004

(54) ROTATIONALLY DESENSITIZED UNISTROKE HANDWRITING RECOGNITION

(75) Inventors: David Goldberg, Palo Alto, CA (US); Roy Want, Los Altos, CA (US); Mark D. Weiser, deceased, late of Palo Alto, CA (US); by Victoria Ann Reich, legal representative, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 523 days.

(21) Appl. No.: 09/901,406

(22) Filed: Jul. 9, 2001

(65) Prior Publication Data

US 2002/0009227 A1 Jan. 24, 2002

Related U.S. Application Data

(63) Continuation of application No. 09/305,835, filed on May 5, 1999, now Pat. No. 6,366,997, which is a continuation of application No. 08/772,157, filed on Dec. 20, 1996, now abandoned, which is a continuation-in-part of application No. 08/548,416, filed on Oct. 26, 1995, now Pat. No. 5,596,656, which is a continuation of application No. 08/132,401, filed on Oct. 6, 1993, now abandoned.

(51) Int. Cl.[7] .............................................. H06F 17/30
(52) U.S. Cl. ........................................................ 707/6
(58) Field of Search .......................... 707/6, 4; 382/186, 382/188, 189, 313, 315; 345/158, 860; 715/541, 540

(56) References Cited

U.S. PATENT DOCUMENTS

| | | |
|---|---|---|
| 3,108,254 A | 10/1963 | Dimond .................... 340/146.3 |
| 3,145,367 A | 8/1964 | Crane ....................... 340/146.3 |
| 3,199,078 A | 8/1965 | Gaffney Jr. et al. ..... 340/146.3 |
| 3,462,548 A | 8/1969 | Rinder ......................... 178/18 |
| 3,500,323 A | 3/1970 | Funk et al. ............... 340/146.3 |
| 3,626,368 A | 12/1971 | Lee .......................... 340/146.3 |
| 3,699,518 A | 10/1972 | Greenough et al. ... 340/146.3 Z |
| 3,784,982 A | 1/1974 | Schlang ................ 340/146.3 J |
| 3,835,453 A | 9/1974 | Narayanan ................ 340/146.3 |
| 3,903,502 A | 9/1975 | Moss ................. 340/146.3 SY |
| 3,930,229 A | 12/1975 | Crane et al. .............. 340/146.3 |
| 3,996,557 A | 12/1976 | Donahey .................. 340/146.3 |
| 4,047,010 A | 9/1977 | Perotto et al. ............... 235/156 |

(List continued on next page.)

FOREIGN PATENT DOCUMENTS

| | | |
|---|---|---|
| EP | 0 107 196 A2 | 5/1984 |
| EP | 0 114 248 A2 | 8/1984 |
| EP | 0 114 249 A2 | 8/1984 |

(List continued on next page.)

OTHER PUBLICATIONS

Adolf, "An Expert System for the Selection of Input Devices", *Proceedings of the Human Factors Society*, 1989, pp. 335–339.

Amin et al., "Machine Recognition of Cursive Arabic Words", *SPIE*, vol. 359, Applications of Digital Image Processing IV, 1982, pp. 286–292.

Anderson, "Syntax–Directed Recognition of Hand–Printed Two–Dimensional Mathematics", date unknown, pp. 436–459.

(List continued on next page.)

*Primary Examiner*—Diane D. Mizrahi
*Assistant Examiner*—Apu M Mofiz
(74) *Attorney, Agent, or Firm*—Thomas Zell

(57) ABSTRACT

A Unistrokes symbollogy in which strokes of like profile (i.e., strokes that are distinguished from each other by their rotational orientation) are rotationally offset from each other by at least 90° is provided. This provides a sufficient tolerance for disambiguating these strokes when they are written into hand-held pen computers and the like by users having widely divergent hand writing styles.

20 Claims, 3 Drawing Sheets

U.S. PATENT DOCUMENTS

| | | | |
|---|---|---|---|
| 4,139,837 A | 2/1979 | Liljenwall et al. | 340/146.3 |
| 4,156,911 A | 5/1979 | Crane et al. | 364/419 |
| 4,241,409 A | 12/1980 | Nolf | 364/705 |
| 4,262,281 A | 4/1981 | Buckle et al. | 340/146.3 |
| 4,365,235 A | 12/1982 | Greanias et al. | 340/146.3 |
| 4,400,697 A | 8/1983 | Currie et al. | 340/711 |
| 4,475,239 A | 10/1984 | van Raamsdonk | 382/57 |
| 4,542,526 A | 9/1985 | Satoh et al. | 382/13 |
| 4,561,105 A | 12/1985 | Crane et al. | 382/13 |
| 4,562,304 A | 12/1985 | Ward et al. | 178/18 |
| 4,573,196 A | 2/1986 | Crane et al. | 382/13 |
| 4,608,658 A | 8/1986 | Ward | 364/574 |
| 4,641,354 A | 2/1987 | Fukunaga et al. | 382/13 |
| 4,656,317 A | 4/1987 | Tsugei et al. | 178/18 |
| 4,718,102 A | 1/1988 | Crane et al. | 382/13 |
| 4,731,857 A | 3/1988 | Tappert | 382/9 |
| 4,751,741 A | 6/1988 | Mochinaga et al. | 382/13 |
| 4,839,634 A | 6/1989 | More et al. | 340/712 |
| 4,860,372 A | 8/1989 | Kuzunuki et al. | 382/13 |
| 4,953,225 A | 8/1990 | Togawa et al. | 382/13 |
| 4,972,496 A | 11/1990 | Sklarew | 382/13 |
| 4,985,929 A | 1/1991 | Tsuyama | 382/48 |
| 5,005,205 A | 4/1991 | Ellozy et al. | 382/3 |
| 5,022,081 A | 6/1991 | Hirose et al. | 381/43 |
| 5,022,086 A | 6/1991 | Crane et al. | 382/2 |
| 5,034,989 A | 7/1991 | Loh | 382/13 |
| 5,038,382 A | 8/1991 | Lipscomb | 382/13 |
| 5,049,862 A | 9/1991 | Dao et al. | 340/706 |
| 5,109,352 A | 4/1992 | O'Dell | 395/150 |
| 5,121,441 A | 6/1992 | Chefalas et al. | 382/13 |
| 5,125,039 A | 6/1992 | Hawkins | 382/30 |
| 5,133,076 A | 7/1992 | Hawkins et al. | 395/800 |
| 5,140,645 A | 8/1992 | Whitaker | 382/11 |
| 5,148,155 A | 9/1992 | Martin et al. | 340/712 |
| 5,150,424 A | 9/1992 | Aguro et al. | 382/13 |
| 5,194,852 A | 3/1993 | More et al. | 340/712 |
| 5,197,810 A | 3/1993 | Zhang et al. | 400/110 |
| 5,214,428 A | 5/1993 | Allen | 341/20 |
| 5,285,505 A | 2/1994 | Kim et al. | 382/13 |
| 5,313,527 A | 5/1994 | Guberman et al. | 382/13 |
| 5,315,667 A | 5/1994 | Fujisaki et al. | 382/13 |
| 5,333,209 A | 7/1994 | Sinden et al. | 382/13 |
| 5,341,438 A | 8/1994 | Clifford | 382/9 |
| 5,347,295 A | 9/1994 | Agulnick et al. | 345/156 |
| 5,491,495 A | 2/1996 | Ward et al. | 345/173 |
| 5,521,986 A | 5/1996 | Curtin, II et al. | 382/187 |
| 5,550,930 A | 8/1996 | Berman et al. | 382/187 |
| 5,596,656 A * | 1/1997 | Goldberg | 382/186 |
| 5,610,996 A | 3/1997 | Eller | 382/187 |
| 5,818,425 A * | 10/1998 | Want et al. | 345/158 |
| 5,940,535 A | 8/1999 | Huang | 382/201 |
| 6,160,555 A * | 12/2000 | Kang et al. | 345/860 |
| 6,167,411 A * | 12/2000 | Narayanaswamy | 715/541 |
| 6,366,697 B1 * | 4/2002 | Goldberg et al. | 382/186 |
| 6,493,464 B1 * | 12/2002 | Hawkins et al. | 382/189 |

FOREIGN PATENT DOCUMENTS

| | | |
|---|---|---|
| EP | 0 114 250 A2 | 8/1984 |
| EP | 0 120 481 A2 | 10/1984 |
| EP | 0 135 615 A2 | 4/1985 |
| EP | 0 243 925 A2 | 11/1987 |
| EP | 0 391 044 A2 | 10/1990 |
| EP | 0 538 705 A1 | 4/1993 |
| EP | 0 572 031 A1 | 12/1993 |
| EP | 0 598 236 A1 | 5/1994 |
| EP | 0 598 402 A1 | 5/1994 |
| EP | 0 607 926 A2 | 7/1994 |
| EP | 0 661 619 A1 | 7/1995 |
| JP | 58-56188 | 4/1983 |
| JP | 59-35277 | 2/1984 |
| WO | WO 90/16030 | 12/1990 |
| WO | WO 92/08183 | 5/1992 |
| WO | WO 94/10678 | 5/1994 |
| WO | WO 94/17468 | 8/1994 |
| WO | WO 94/22109 | 9/1994 |

OTHER PUBLICATIONS

Arakawa, "On–Line Recognition of Handwritten Characters—Alphanumberics, Hiragana, Katakana, Kanji," 1982, pp. 9–21.

Author unknown, "The Alternative to the Keyboard . . .", Creative Ventures, Inc., date unknown.

Author unknown, "American National Standard Character Set for Handprinting", American National Standards Institute, Inc., May 14, 1974.

Author unknown, "Appendix VIII The Ledeen Character Recognizer", date unknown, pp. 576–582.

Author unknown, "Background Information GO Corp.'s PenPoint™ Operating System For Mobile, Pen–Based Computers", date unknown.

Author unknown, "Chapter 14: Research Frontier and Unsolved Problems", pp. 641–650, date unknown.

Author unknown, "Cree Syllabics Table", Http:/www.nisto.com/cree/syllabic/, date unknown.

Author unknown, "Data Entry Systems", Script Writer, date unknown.

Author unknown, "GRiDPAD Computer Owner's Guide", Jan., 1990 (p. 4–10 missing).

Author unknown, "Handprints", Skylight Software, Inc., 1987.

Author unknown, "Handwriter® Data Entry System Layout Design System™ Manual", Communication Intelligence Corporation, Version 1.1, May 1988.

Author unknown, "Handwriter Data Entry System User's Guide", Communication Intelligence Corporation, 1988.

Author unknown, "Handwriter®' Expanding the World of Computing" Brochure, Communication Information Corporation, date unknown.

Author unknown, "Help for the Illegible", *MD Magazine*, Sep., 1988.

Author unknown, "Interactive Graphics", date unknown, pp. 174–180 and 227–231.

Author unknown, "Linus Prepares to Ship Handwriting Recognition System 'Write–Top' Allows Users to Write Directly on Display", Linus Technologies, Inc., 1988.

Author unknown, "Linus™ Write–Top User's Guide", date unknown.

Author unknown, "Linus Writing PC with Will Wood", date unknown (video tape).

Author unknown, "Micropad User's Guide", Micropad Limited, date unknown.

Author unknown, "Microsoft® Handwriting Symbol Recognition", Linus Technologies, Inc., Nov., 1989.

Author unknown, "Module No. 320", date unknown.

Author unknown, "Momenta User's Reference Manual", Momenta Corporation, 1991.

Author unknown, "The Moon Alphabet," from http://www.s55wilma.demon.co.uk/moon.html, date unknown.

Author unknown, "The Moon System of Embossed Reading," from Http://www.bsblind.co.uk/full/moon/moontype.htm, date unknown.

Author unknown, "New Products", *Software Magazine*, Sep. 1988.

Author Unknown, "PenDOS™ API Quick Reference, Version 1.2", Communication Intelligence Corporation, 1992 (odd pages missing).

Author unknown, "PenDOS™ Customization Guide", Communication Intelligence Corporation, 1992 (even pages missing).

Author Unknown, "PenDOS Installation", Communication Intelligence Corporation, 1992 (even pages missing).

Author unknown, PenDOS™ User'Guide, Communication Intelligence Corporation, 1992.

Author unknown, "PenDOS™ User Manual", Communication Intelligence Corporation, 1991.

Author Unknown, "PenDOS™ Version 1.0 User Manual,", Communication Intelligence Corporation, 1991.

Author unknown, "PenDOS™ Version 1.1 User Manual", Communication Intelligence Corporation, 1991.

Author unknown, "Penpad® 320 User's Guide", Pencept, Apr. 1986.

Author unknown, "PenSet" software, data unknown.

Author unknown, "Shaw Alphabet Links", Http://members.aolcom/RSRICHMOND/shavian.html, date unknown.

Author unknown, "System 3125 User's Manual", NCR, Oct., 1991.

Author unknown, "Wierd Technology", PCWeek Editorial, Sep., 1988.

Author unknown, "What are Cree Syllabics", Http://www.storm,ca/~jspence/whatis.htm, date unknown.

Author unknown, "Writaway Hand–Print Can Reduce Data Preparation Costs by up to 50%", Rediffusion Computers, date unknown.

Author unknown, "Write into your Computer", Pencept, 1983.

Babb et al., "Pattern Algorithm Permits Freehand Printed–Data Entry", *Computer Technology Review*, Winter 1982.

Bernstein, "Computer Recognition of On–Line, Hand–Written Characters", The Rand Corporation, Oct., 1964.

Bernstein, "A Method for Recognizing Handprinted Characters in Real Time", System Development Corporation, date unknown, pp. 109–114.

Blackwell et al., "An On–Line Symbolic Mathematics System Using Hand–Printed Two–Dimensional Notation", Rand Corporation, Jan. 1970.

Blatt et al., "Gesture Set Economics for Text and Spreadsheet Editors", Wang Laboratories, Inc., date unknown.

Blatt et al., "Spreadsheet Gesture Set", Feb. 2, 1989.

Blesser et al., "Human Factors Affecting the Problem of Machine Recognition of Hand–Printed Text," Proceedings of the Seventh Annual Conference and Exposition, Anaheim, California, May 11–15, 1986, Vol. III Technical Sessions, pp. 498–514.

Brooks et al., "Computer Transcription of Handwritten Shorthand as an Aid for the Deaf—a Feasibility Study", *Int. J. Man–Machine Studies*, 1985.

Brown et al., "Cursive Script Recognition", Department of Electrical & Computer Engineering, Univ. Of Michigan, date unknown, pp. 47–51.

Brown et al., "Preprocessing Techniques for Cursive Script Word Recognition", 1983, pp. 447–458.

Brown, "A Real Time Handprinted Character Recognizer", Mass. Inst. of Tech., 1970.

Brown et al., "Using Dynamic Programming for Segmentation in On–Line Handprint Recognition," Jan. 10, 1991.

Burr, "Designing a Handwriting Reader," IEEE Transactions on Pattern Analysis and Machine Intelligence, vol. PAMI–5, No. 5, Sep. 1983, pp. 554–559.

Burr, "Elastic Matching of Line Drawing", *IEEE Transactions of Pattern Analysis and Machine Intelligence*, vol. PAMI–3, No. 6, Nov. 1981, pp. 708–713.

Buxton, "Chunking and Phrasing and the Design of Human–Computer Dialogues," Information Processing 86, 1986, pp. 494–499.

Buxton et al., "The Evolution of the SSSP Score Editing Tools," Computer Music Journal, vol. 32, No. 4, Dec. 1979, pp. 14–25 and 60.

Buxton, "An Informal Study of Selection–Positioning Tasks," Proceedings of Graphics Interface '82, Toronto, May 1982.

Casey et al., "Decision Tree Design Using a Probabilistic Model", *IEEE Transactions on Information Theory*, vol. IT–30, No. 1, Jan. 1984, pp. 93–99.

Caskey et al., "Machine Recognition of Handprinted Characters", date unknown.

Chapman, "Computer Trades Keyboard for 'Pen'", *The Connection*, Aug. 31, 1988.

Citrin et al., "Distributed Architectures for Pen–Based Input and Diagram Recognition", date unknown.

Crane et al., "An On–Line Data Entry System for Hand–Printed Characters", Mar., 1977.

Crane et al., "A Technique for the Input of Handprinted Chinese Characters Based on Sequential Stroke Recognition", *Proceedings of International Computer Symposium*, vol. 1, Dec. 1977, pp. 246–261.

Daniels, "Shorthand," The World's Writing Systems, Oxford University Press, Oxford, 1996, pp. 807–820.

"Decision and Order," in part from Defendants' motion for summary judgment arguing invalidity under 35 U.S.C. 102(b) for prior public use in the United States: Civil Judgment No. 97–CV–6182T, Xerox v. 3Com et al., Rochester, N.Y., Sep. 29, 1998.

"Defendant Palm's First Supplement Responses to Plantiff's Interrogatories Nos. 8, 9, and 10 Under Fed. R. Civ. P. 33," Xerox v. 3Com et al., Rochester, N.Y., Sep. 30, 1997.

"Defendants' Second Supplemental Responses to Plaintiff's Interrogatories Nos. 8, 9, and 10 Under Fed. R. Civ. P. 33," Xerox v.3Com et al., Rochester, N.Y., Mar. 26, 1998.

Dictionary excerpt of Moon–Type alphabet, Webster's Third New International Dictionary of the English Language Unabridged, 1986, pp. 1467.

Ellozy, "The Paper–Like Interface: An Overview", *SID 90 Digest*, 1990, pp. 168–171.

Fujisaki et al., "Online Recognizer for Runon Handprinted Characters," Proceedings 10th International Conference on Pattern Recognition, Jun. 16–21, 1990, Atlantic City, New Jersey, vol. 1, pp. 450–454.

Fujisaki et al., "On–line Run–on Character Recognizer: Design and Performance", *International Journal of Pattern Recognition and Artificial Intelligence*, vol. 5, Nos. 1 & 2, Jun. 1991pp. 123–137.

Glatte, "Gabelsberger Shorthand," Shorthand Systems of the World: A Concise Historical and Technical Review, New York.

Goldberg et al., "Stylus User Interfaces for Manipulating Test," Xerox CSL–91–9, Sep. 1991.

Goldberg et al., "Touch–Typing with a Stylus," Proceedings of INTERCHI '93 Conference on Human Factors in Computing Systems, Apr. 24–29, 1993, Amsterdam, pp. 80–87; also published as "Touch–Typing with a Stylus," Xerox CSL–93–1, May 1993.

Goodisman, "A Stylus–Based User Interface for Text: Entry and Editing," MIT Master's Thesis, May 1991.

"GRIDPAD Computer User's Guide", Aug. 1990.

Groner, Real–Time Recognition of Handprinted Text, Memorandum RM–5016–ARPA, Oct. 1966.

Guberman et al., "Algorithm for the Recognition of Handwritten Text," 1975, pp. 752–757.

Gutman, "A Note Pad that Understands Your Handwriting", *The Philadelphia Inquirer*, Sep. 1, 1988.

Ikeda et al., "On–Line Recognition of Hand–Written Characters Utilizing Positional and Stroke Vector Sequences", 1980, pp. 192–206.

Kolker, "Digital Penmanship", *Warfield's*, Oct., 1988.

Leedham et al., "Automatic Recognition and Transcription of Pitman's Handwritten Shorthand—An Approach to Shortforms" (1987), *Pattern Recognition*, vol. 20, No. 3.

Leedham et al., "On–Line Acquisition of Pitman's Handwritten Shorthand as a Means of Rapid Data Entry", date unknown, pp. 86–91.

Leedham et al., "On–Line Recognition of Pitman's Handwritten Shorthand—an Evaluation of Potential," International Journal of Man–Machine Studies, vol. 24, No. 4, Apr. 1986, pp. 375–393.

Lev et al., "Recognition of Handwritten Hebrew One–Stroke Letters by Learning Syntactic Representation of Symbols," IEEE Transactions on Systems, Man and Cybernetics, vol. 19, No. 5, Sep.–Oct. 1989, pp. 1306–1313.

Linderholm, "Linus Write–Top", *Personal Computer World*, Oct. 1988.

"Linus™ Write–Top User's Guide", pp. 2–10 to 2–15, Linus Technologies, Inc., 1987.

Lipscomb, "A Trainable Gesture Recognizer," Research Report RC 16448 (#73078), IBM Research Division, Jan. 17, 1991.

Litvin, "Principles of Evaluation for Handwritten and Cursive Text Recognition Methods", GTE Laboratories, Inc., Jan., 1982.

Loomis, "Graphical Manipulation Techniques Using the Lincoln TX–2 Computer", Massachusetts Institute of Technology, Nov. 10, 1960.

Mandler, "Advanced Preprocessing Technique for On–Line Recognition of Handprinted Symbols," Computer Recognition and Human Production of Handwriting, 1989, pp. 19–36.

Mandler et al., "Experiments in On–Line Script Recognition", 4th Scandinavian Conference on Image Analysis Proceedings, 1985.

Marlow, "Ralph's Brain Child Wins Top British Award", *The Times*, Sep., 1988.

McCormick, "An Intelligent Clipboard", *ID Systems*, Sep., 1988.

McMaster, "The Cutting Edge", *PCResource*, Oct., 1988.

Miller, "On–line Recognition of Hand–Generated Symbols", *Fall Joint Computer Conference*, 1969, pp. 399–412.

Miller, "On–Line Recognition of Hand–Generated Symbols," AFIPS Conference Proceedings vol. 35, Las Vegas, Nov., 18–20, 1969, pp. 399–412.

Minneman, "Handwritten Character Recognition Employing Topology, Cross Correlation, and Decision Theory", *IEEE Transactions on Systems Science and Cybernetics*, vol. SSC–2, No. 2, Dec., 1966, pp. 86–96.

Nagayama et al., "Pen–Touch–Type Electro–Magnetic Transparent Touch Panel", *SID 85 Digest*, May 1985, pp. 32–35.

Nair et al., "Evaluation of Dynamic Programming Algorithms for the Recognition of Shortforms in Pitman's Shorthand," Pattern Recognition Letters, vol. 13, No. 8, Aug. 1992, pp. 605–612.

Nakagawa, "Non–keyboard Input of Japanese Text On–line Recognition of Handwritten Characters as the Most Hopeful Approach," Journal of Information Processing, vol. 13, No. 1, 1990, pp. 15–34.

Nouboud et al., "On–Line Recognition of Handprinted Characters: Survey and Beta Tests" Pattern Recognition, vol. 23, No. 9, 1990, pp. 1031–1044.

O'Callaghan, "Problems in On–Line Character Recognition", date unknown, pp. 193–211.

Organek™ Technology "Penput™—Beyond Character Recognition!" and "Organek™ Standards".

PenPut Disk.

"PenRight! Application User's Guide", GRID Systems Corporation, Jul. 1992, pp. 10–19.

"Plantiff's Responses to Defendants' First Requests for Admissions Nos. 1–385," Xerox v. 3Com et al., Rochester, N.Y.

Plamondon et al., "Automatic Signature Verification and Writer Identification—the State of the Art", *Pattern Recognition*, vol. 22, No. 2, 1989, pp. 107–131.

Plamondon et al., "A Dedicated Microcomputer for Handwritten Interaction with a Software Tool: System Prototyping", Journal of Microcomputer Applications, Academic Press. Inc., Limited, 1986.

Plamondon et al., "Modelization of Handwriting: A System Approach", date unknown.

Plamondon et al., "On–Line Recognition of Handprint Schematic Pseudocode for Automatic Fortran Code Generation", *IEEE Proceedings of the Eighth International Conference on Pattern Recognition*, Paris, Oct. 27–31, 1986, pp. 741–744.

Plamondon et al., "A System for Signature Analysis and Verification Based on an Accelerometer Pen" *IEEE Proceedings International Carnahan Conference on Security Technology*, Oct. 4–6, 1983, pp. 157–163.

Purcell, "Understanding Hand–Printed Algebra for Computer Tutoring", *Massachusetts Institute of Technology.*, Feb. 1977.

Raleigh, "One–Step Data Entry System Links Forms with Computers", *Form*, Vol. XXIII, No. 4, Apr. 1985.

Rubine, "The Automatic Recognition of Gestures," CMU–CS–91–202, Dec. 1991.

Rubine, "Combining Gestures and Direct Manipulation," CH'92 Conference Proceedings Striking a Balance, Monterey, California, May 3–7, 1992, pp. 659–660.

Rubine, "Integrating Gesture Recognition and Direct Manipulation," USENIX, Nashville, Tennessee, Summer 1991, pp. 281–298.

Rubine, "Specifying Gestures by Examples", *Computer Graphics*, vol. 25, No. 4, Jul., 1991, pp. 329–337.

Schoonard et al., "A Behavioral Study of a Computer Hand Print Recognition System", IBM Research, Yorktown Heights, New York, RC 12494, (#56157) Feb. 6, 1987.

Simek et al., "Handprinting Input Device for Computer Systems", *IEEE Spectrum*, Jul., 1967, pp. 72–81.

Simmons, "An On–Line Character Recognizer", *Business Section Interface Age*, Mar. 1980.

Sklarew, "Death of a Keyboard", Technology Today and Tomorrow, *Best's Review*, Feb., 1989.

Spanjersberg, "Experiments with Automatic Input of Handwritten Numerical Data into a Large Administrative System", *IEEE Transaction Systems, Man and Cybernetics*, Apr. 1978.

Stocker, "Linus Hopes to Blanket the Market for Converting Handwriting to Type", *Washington Business Journal*, Sep. 12, 1988.

Suen. et al., "Automatic Recognition of Handprinted Characters—The State of the Art," Proceedings of the IEEE vol. 68, No. 4, Apr. 1980, pp. 469–487.

Suenaga, "A Facsimile Based Text Editor Using Handwritten Mark Recognition", date unknown, pp. 856–858.

Tappert, "Adaptive On–Line Handwriting Recognition," Proceedings of IEEE Seventh International Conference on Pattern Recognition, Jul. 30–Aug. 2, 1984, Montreal, Canada, pp. 1004–1007.

Tappert, "An Adaptive System for Handwriting Recognition," Research Report RC 11175 (#50249), IBM Research Division, May 21, 1985.

Tappert et al., "Elastic Matching for Handwritten Symbol Recognition," Research Report RC9988 (44324), IBM Research Division, May 23, 1983.

Tappert et al., "On–Line Handwriting Recognition—A Survey," Proceedings of IEEE $9^{th}$ International Conference on Pattern Recognition, Rome, Italy, Nov. 14–17, 1988, vol. II, pp. 1123–1132.

Tappert et al., Research Report "Handwriting Recognition on Transparent Tablet over Flat Display," IBM T.J. Watson Research Center, Yorktown Heights, New York, RC 11856 (Log #52695), Mar. 3, 1986.

Tappert, "Speed, Accuracy, Flexibility Trade–Offs in On–Line Character Recognition," Research Report RC 13228 (#59158), IBM Research Division, Oct. 28, 1987.

Tappert et al., "The State of the Art in On–Line Handwriting Recognition," IEEE Transactions on Pattern Analysis and Machine Intelligence, vol. 12, Aug. 1990, pp. 787–808.

Teitelman, "Real Time Recognition of Hand–Drawn Characters", *Proceedings—Fall Joint Computer Conference*, 1964, pp. 559–575.

Terai et al., "Text Editing System Using On–Line Real–Time Handwriting Character Recognition", *Journal of Information Processing Society of Japan*, vol. 15, No. 6, Jun., 1974.

Tersoff, "Man–Machine Considerations in Automatic Handprint Recognition", *IEEE Transactions on Systems, Man and Cybernetics*, vol. SMC–8, No. 4, Apr., 1978, pp. 279–282.

Thornberg, "The PrestoDigitizer™ Tablet A Low–Cost Alternative to Data Entry Keyboards", *Recreational Computing*, Jan.–Feb., 1980, pp. 16–18.

Tironian alphabet, Panati's Browser's Book of Beginnings, pp. 81–82.

"Users Manual for Penpad™ 320", Pencept Corporation, Mar. 1984, pp. 14–15.

Ward et al., "Interactive Recognition on Handprinted Characters for Computer Input," IEEE, Sep. 1985, pp. 24–37.

Waters, "Back to Basics", *Discover*, Dec., 1988, pp. 26–27.

Weaver, "On–Line Character Recognition", Report No. UIUCDCS–R–74–660, Aug., 1974, Department of Computer Science, University of Illinois at Urbana–Champaign.

Wolf, "Can People Use Gesture Commands?", Research Report, RC 11867 (#53105), IBM Research Division, Apr. 17, 1986.

Wolf, "A Comparative Study of Gestural and Keyboard Interfaces", *Proceedings of the Human Factors Society—$32^{nd}$ Annual Meeting*—1988, pp. 273–276.

Wolf et al., "The Use of Hand–Drawn Gestures for Text Editing", *International Journal of Man–Machine Studies*, 1987, pp. 91–102.

"Xerox' Second Supplemental Response to Interrogatory No. 1 and First Supplemental Response to Interrogatory No. 9 of Defendants' First Set of Interrogatories to Plaintiff Xerox Corporation," Xerox v.3Com et al., Rochester, N.Y.

* cited by examiner

ROTATIONALLY DESENSITIZED UNISTROKE HANDWRITING RECOGNITION

CROSS REFERENCE TO RELATED APPLICATION

This application is a continuation of application Ser. No. 09/305,835 filed May 5, 1999. Application Ser. No. 09/305,835 now U.S. Pat. No. 6,366,697 B1 is a continuation of application Ser. No. 08/772,157 filed Dec. 20, 1996 (now abandoned). Application Ser. No. 08/772,157 is a continuation-in-part of a commonly assigned United States patent application of David Goldberg, which was filed Oct. 26, 1995 under Ser. No. 08/548,416 filed on Oct. 26, 1995 on a "UNISTROKES FOR COMPUTERIZED INTERPRETATION OF HANDWRITING" (now U.S. Pat. No. 5,596,656) which, in turn, is a continuation of application Ser. No. 08/132,401 filed Oct. 6, 1993 (now abandoned). The foregoing application is referred to hereinafter as the "basic Unistrokes application."

FIELD OF THE INVENTION

This invention relates to handwriting recognition and, more particularly, to handwriting recognition for hand-held pen computers and the like.

BACKGROUND OF THE INVENTION

The basic Unistrokes application describes a handwriting recognition system and methodology which utilizes continuous, explicitly delimited strokes for representing natural language symbols at the atomic level (i.e., alphanumeric characters for English and other orthographic natural language representations, and phonemes for phonetic systems). Additional strokes of like type can be interspersed with these symbol representing strokes for control purposes, such as for switching between look-up tables for lower and upper case characters and for less frequently utilizes punctuation marks, text editing functions and special constructs (e.g., equations). See, for example, a copending, commonly assigned United States patent application of Dennis Venable, which was filed Jan. 3,1995 under Ser. No. 08/368,122 on "SELF-DELIMITING SPECIFICATION OF MULTIDIMENSIONAL CHARACTER CONSTRUCTIONS FOR PEN COMPUTERS" (now abandoned). Furthermore, the usual single stroke per natural language symbol characteristic of the Unistroke alphabet may be relaxed if desired to permit some or all of the natural language symbols to be represented by multiple, separately delimited strokes, such as may be needed or desired for applications involving larger natural language symbol sets. See, for example, a copending, commonly assigned United States patent application of Robert R. Buckley, which was filed Jan. 3,1995 under Ser. No. 08/368,136 on "EXTENDED SELF-DELIMITING DATA ENTRY FOR PEN COMPUTERS" (now abandoned).

Successive Unistroke symbols are positively delimited from each other by a predetermined, intervening, stroke independent delimiting operation, such as the waiting for writing these symbols into a pen computer or the like. This positive delimiting of successive Unistroke strokes significantly simplifies the recognition process by parsing the respective strokes completely independently of their spatial relationship while capturing the logical ordering of these strokes based on the time order in which they are written. Thus, the Unistroke symbollogy and recognition process are well suited for applications in which spatial ordering of stroke-by-stroke cyclical changes in the pressure atypical user causes a stylus or electric pen to exert against a writing surface during and following, respectively, while symbols is difficult to achieve or assure, such as "heads-up" writing and/or for applications requiring the writing of symbols on small writing surfaces that are too small to maintain an easily recognizable spatial separation between logically ordered symbols that are written on a scale that is natural and comfortable to the ordinary user.

The basic Unistrokes application recognizes that the symbol recognition process is further simplified if the Unistroke symbols are well separated from each other in "sloppiness space," which means that there is little, if any, geometric overlap between the different symbols (including the ordinary variants of the respective symbols). This goal is well met by the Unistroke alphabet that is disclosed in the basic Unistrokes application when the symbols are written by different users under reasonably consistent conditions. In practice, however, it has been found that the tilt angle at which different users tend to write strokes on easily rotatable writing surfaces, such as the input interfaces of hand-held computers, is a user dependent variable which varies significantly from user-to-user. Some users intuitively compensate for rotational tilt of the writing surface by generally referencing their strokes to the principal axis of the writing surface, but other users tend to reference their strokes to other features of their environment, such as the principal axis of their bodies. Thus, the rotational tilt of the writing surface sometimes introduces an unwanted ambiguity that reduces the reliability of the character recognition process. Accordingly, it would be desirable to avoid this ambiguity, especially if that can be done without interfering with the users' normal work practices.

SUMMARY OF THE INVENTION

To that end, the present invention defines a Unistrokes symbollogy in which strokes of like profile (i.e., strokes that are distinguished from each other by their rotational orientation) are rotationally offset from each other by at least 90°. This provides a sufficient tolerance for disambiguating these strokes when they are written into hand-held pen computers and the like by users having widely divergent hand writing styles.

BRIEF DESCRIPTION OF THE DRAWINGS

Still further objects and advantages of this invention will become apparent when the following detailed description is read in conjunction with the attached drawings, in which:

FIG. 2 is a simplified block diagram of a Unistroke handwriting recognition system that is suitable for use in a pen computers and the like;

DETAILED DESCRIPTION OF THE INVENTION

While the invention is described in some detail hereinafter with reference to a single illustrated embodiment, it is to be understood that there is no intent to limit it to that embodiment. On the contrary, the intent is to cover all modifications, alternatives and equivalents falling within the spirit and scope of the invention as defined by the appended claims.

Figure 1:
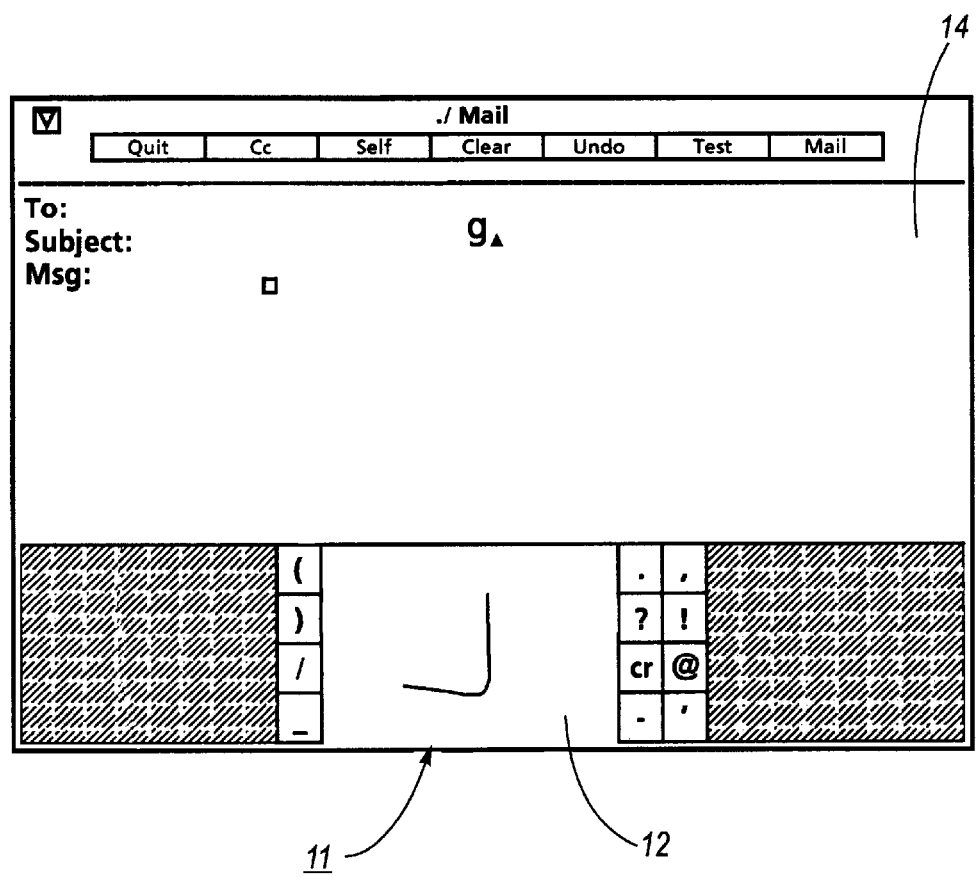
FIG. 1 is a simplified schematic diagram of a user interface for a hand-held pen computer of the type in which the present invention can be used to advantage.

Turning now to the drawings, and at this point especially to FIG. 1, there is a user interface 11 for a more or less conventional pen computer with which this invention may be used to advantage. As shown, the interface 11 includes a pressure sensitive region 12 for sensing the engagement and disengagement of a stylus or similar writing instrument therewith and for translating the motion of the pressure engaged writing instrument into an ordered list of x/y coordinates (see FIG. 2). Alternatively, an electronic pen could be used to perform the writing and to translate the strokes that are written into respective ordered list of x/y coordinates.

Unistroke symbols are entered into the pen computer by bringing the writing instrument into pressure contact with the writing surface 12 and by then dragging the writing instrument across the surface on an appropriately dissected path to trace out an approximate facsimile of one or another of the defined Unistroke symbols. The writing instrument typically is then disengaged from the writing surface 12 before being brought back into pressure contact therewith in preparation for writing the next Unistroke symbol. In other words, as described in more detail hereinbelow sequentially written Unistroke strokes are conveniently delimited from each other by monitoring the pressure which the user causes the writing instrument during to exert against the writing surface during the ordinary writing of those strokes. However, other stroke independent delimiting operations could be employed to appropriately separate the stroke dependent ordered sets of x/y coordinates from each other. As will be seen, this stroke-by-stroke parsing of the ordered sets of x/y coordinates enables a stroke recognition unit 13 (FIG. 2) to easily translate the recognizable sets of ordered x/y coordinates into corresponding natural language symbols for viewing on a display, such as the display region 14 of the pen computer user interface shown in FIG. 1.

Figure 2:
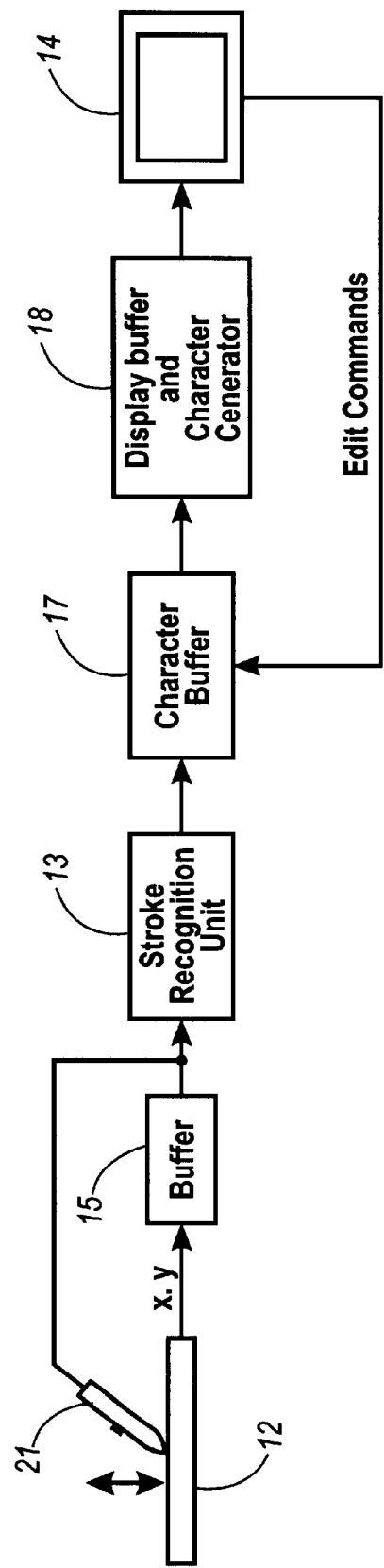

More particularly, as shown in FIG. 2, a user typically brings a stylus 21 into pressure contact with a pressure sensitive grid-like writing surface or region 12 and then draws the stylus 21 across the surface 12 to write a Unistroke symbol thereon. The user then lifts the stylus 21 from the surface 12 (or relaxes the pressure applied thereby to the writing surface 12) before repeating the cycle to write the next Unistroke symbol. A buffer 15, which is cleared when the pressure that the stylus 12 exerts against the writing surface 12 exceeds a predetermined threshold, accumulates the ordered x/y coordinates that are output from the writing surface 12 as the stylus 21 is being drawn there across to construct an ordered list. Then, when the pressure applied to the writing surface 12 drops below the sense threshold, this ordered set or list of x/y coordinates is transferred to the stroke recognition unit 13.

As described in further detail in the basic Unistrokes application, which is hereby incorporated by reference, the stroke recognition unit 13 analyzes the directional and geometric profile features of each of the ordered lists of x/y coordinates that it receives from the buffer 15 in light of the known directional and geometric profile features of the defined Unistroke symbols to identify the Unistroke symbol which best fits the stroke represented by the given list of coordinates or to reject the stroke as being non-recognizable (and to optionally notify the user—by means not shown of any such rejection). A table look-up memory (not shown) within the recognition unit 13 maps the Unistroke symbols into the corresponding natural language symbols and text editing operations (such as backspacing and carriage returns), so the character codes for natural language symbols/text editing operations which correspond to the recognized Unistroke symbols are sequentially fed into a character buffer 17. Editing is carried out in the character buffer 17 in response to editing commands received from the recognition unit 13 and/or through the operation of edit buttons on the user interface 11 (FIG. 1). The edited character codes for the natural language symbols are, in turn, serially fed from the character buffer 17 to a display buffer and character generator 18 for display on the display 14.

Figures 3, 4:
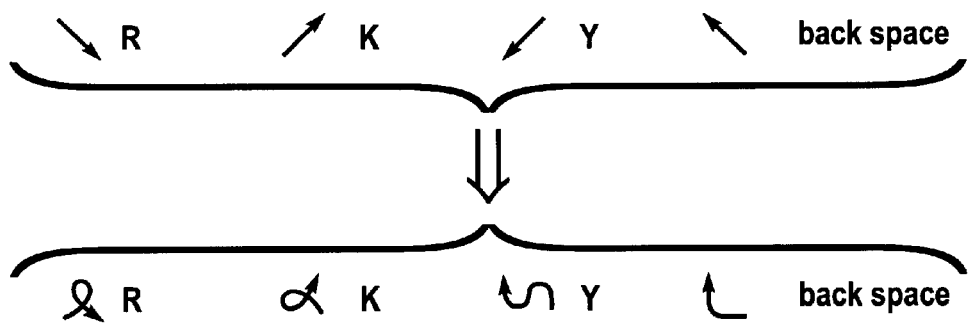
FIG. 3 illustrates an existing Unistroke symbol alphabet.
FIG. 4 illustrates the modifications that are made to the alphabet shown in FIG. 3 in accordance with this invention to reduce its rotational sensitivity.

Referring to FIG. 3, it will be seen that the Unistroke alphabet that is described in the basic Unistrokes application includes symbols that are distinguished from each other only by their rotational orientations. Specifically, in the alphabetic character mode of the illustrated alphabet, the Unistroke symbols fall into this category include the straight-line symbols which are assigned to represent the English characters a, e, i, k, r, t, y, and the backspace operation. Symbols that match under rotation are sensitive to the rotational orientation in which they are written onto the writing surface 12.

Referring now to FIGS. 3 and 4, in accordance with this invention, sufficient rotational tolerance is built into the Unistroke (alphabet to reduce, if not eliminate, the risk of confusion among rotationally distinguished symbols when those symbols are written at rotational orientations falling anywhere within the range of tilt angles at which right handed and left handed users are likely to write them into a hand-held pen computer that has a definite up/down orientation to its user interface, such as at 11 in FIG. 1. This is a subjective standard, but it has been heuristically determined that a 90° angular separation between rotationally matching Unistroke symbols provides sufficient rotational tolerance to accommodate the writing styles of the great majority of users, even when the of such hand-held pen computers. Accordingly, the Unistroke alphabet shown in FIG. 3 is modified as shown in FIG. 4 to ensure that all rotationally matching symbols are angularly displaced from each other by at least 90° and no more than 180°. This is accomplished in the illustrated embodiment by substituting new symbols for the diagonally oriented straight line symbols that represented r, k, y, and backspace in the prior art Unistroke alphabet shown in FIG. 3. However, this relatively minor change dramatically increases the rotational tolerance of the illustrated Unistroke alphabet, without significantly increasing its complexity or the time that is needed to learn it.

Conclusion

In view of the foregoing, it will be understood that this invention provides a rotationally desensitized Unistroke symbollogy for reducing the risk of recognition errors in Unistroke-type handwriting recognition systems, without significantly increasing the complexity of the symbollogy. Rotationally matching Unistroke symbols are included in the Unistroke alphabet to simplify the symbollogy, but these symbols are nominally rotationally displaced from each other by at least 90°, thereby providing a minimum rotational tolerance of almost ±45° to accommodate the writing styles of different users while still maintaining adequate rotational differentiation for reliable recognition of these symbols.

What is claimed is:

1. A machine implemented method for interpreting handwritten text comprising writing said text in sequential time order using a natural language alphabet of mutually independent alphanumeric unistroke symbols to spell out said text at an atomic level, each of said unistroke symbols conforming to a respective graphical specification that includes a stroke direction parameter, some of said unistroke symbols being rotationally differentiated symbols which are characterized by having graphical specifications that differ from each other essentially only on the basis of their respective stroke direction parameters, with said respective stroke direction parameters of all of said rotationally differentiated symbols being rotationally offset from each other by at least 90° and no more than 180°;

signaling a predetermined, symbol independent delimiter between successive ones of said unistroke symbols in said time order;

capturing the stroke direction of each of said unistroke symbols as an ordered list of coordinates;

disambiguating said unistroke symbols from each other based upon predetermined criteria, including the stroke directions of the respective symbols;

wherein the natural language alphabet of mutually independent alphanumeric unistroke symbols is defined by a first set of unistroke symbols and a second set of unistroke symbols.

2. The method of claim 1 wherein the natural language is English.

3. The method of claim 1 wherein the first set of unistroke symbols represent alphabetic characters from the group comprising: a, b, c, d, e, f, g, h, i, j, k, l, m, n, o, p, q, r, s, t, u, v, w, x, y, and z.

4. The method of claim 3 wherein the second set of unistroke symbols represent numeric symbols from the group comprising: 0, 1, 2, 3, 4, 5, 6, 7, 8, and 9.

5. The method of claim 1 wherein the second set of unistroke symbols represent numeric symbols from the group comprising: 0, 1, 2, 3, 4, 5, 6, 7, 8, and 9.

6. The method of claim 1 wherein the first set of unistroke symbols and the second set of unistroke symbols have at least one identical unistroke symbol.

7. The method of claim 6 wherein the first set of unistroke symbols represent alphabetic characters from the group comprising: a, b, c, d, e, f, g, h, i, j, k, l, m, n, o, p, q, r, s, t, u, v, w, x, y, and z.

8. The method of claim 7 wherein the first set of unistroke symbols includes unistroke symbols that represent numeric symbols from the group comprising: 0, 1, 2, 3, 4, 5, 6, 7, 8, and 9.

9. A handwriting recognition process for pen computers, said process comprising the steps of correlating unistroke symbols with natural language alphanumeric symbols, each of said unistroke symbols being fully defined by a single continuous stroke that conforms geometrically and directionally to a predetermined graphical specification, with certain of said unistroke symbols having graphical specifications that are distinguished from each other solely by their respective stroke directional parameters, all of said unistroke symbols that are distinguished from each other solely by their respective stroke directional parameters being rotationally offset from each other by at least 90° and no more than 180°;

entering user written unistroke symbols into buffer memory in sequential time order, successive ones of said unistroke symbols being delimited from each other by a predetermined, symbol independent delimiting operation;

reading out said unistroke symbols from said buffer memory in said sequential time order to provide buffered unistroke symbols;

translating each buffered unistroke symbol that correlates with a natural language symbol into said natural language symbol; and outputting any natural language symbols that are produced by said translating step to a utilization device;

wherein the natural language alphabet of mutually independent alphanumeric unistroke symbols is defined by a first set of unistroke symbols and a second set of unistroke symbols.

10. The handwriting recognition process of claim 9 wherein certain unistroke symbols correlate with said natural language alphanumeric symbols, and other unistroke symbols correlate with user invokeable control functions.

11. The handwriting recognition process of claim 10 wherein at least one of said other unistroke symbols correlates with a control function that shifts the correlation of at least some of said certain unistroke symbols from a first set of natural language alphanumeric symbols to a second set of natural language alphanumeric symbols.

12. The handwriting recognition process of claim 11 wherein the first set of natural language alphanumeric symbols are lower case characters and the second set of natural language alphanumeric symbols are upper case characters.

13. The handwriting recognition process of claim 12 wherein the lower case characters and upper case characters are characters from the group comprising: a, b, c, d, e, f, g, h, i, j, k, l, m, n, o, p, q, r, s, t, u, v, w, x, y, and z.

14. The handwriting recognition process of claim 9 wherein the natural language is English.

15. The handwriting recognition process of claim 9 wherein the first set of unistroke symbols represent alphabetic characters from the group comprising: a, b, c, d, e, f, g, h, i, j, k, l, m, n, o, p, q, r, s, t, u, v, w, x, y, and z.

16. The handwriting recognition process of claim 15 wherein the second set of unistroke symbols represent numeric symbols from the group comprising: 0, 1, 2, 3, 4, 5, 6, 7, 8, and 9.

17. The handwriting recognition process of claim 9 wherein the second set of unistroke symbols represent numeric symbols from the group comprising: 0, 1, 2, 3, 4, 5, 6, 7, 8, and 9.

18. The handwriting recognition process of claim 9 wherein the first set of unistroke symbols and the second set of unistroke symbols have at least one identical unistroke symbol.

19. The handwriting recognition process of claim 18 wherein the first set of unistroke symbols represent alphabetic characters from the group comprising: a, b, c, d, e, f, g, h, i, j, k, l, m, n, o, p, q, r, s, t, u, v, w, x, y, and z.

20. The handwriting recognition process of claim 19 wherein the second set of unistroke symbols represent numeric symbols from the group comprising: 0, 1, 2, 3, 4, 5, 6, 7, 8, and 9.

* * * * *